(12) United States Patent
Fujikawa et al.

(10) Patent No.: US 8,426,048 B2
(45) Date of Patent: Apr. 23, 2013

(54) BATTERY PACK, ELECTRONIC APPARATUS EQUIPPED WITH THE SAME AND ELECTRONIC APPARATUS EQUIPPED WITH BATTERY HOUSING PART

(75) Inventors: Masato Fujikawa, Osaka (JP); Mikinari Shimada, Osaka (JP)

(73) Assignee: Panasonic Corporation, Osaka (JP)

( * ) Notice: Subject to any disclaimer, the term of this patent is extended or adjusted under 35 U.S.C. 154(b) by 996 days.

(21) Appl. No.: 12/363,251

(22) Filed: Jan. 30, 2009

(65) Prior Publication Data
US 2009/0197153 A1 Aug. 6, 2009

(30) Foreign Application Priority Data

Feb. 4, 2008 (JP) .................................. 2008-023598
Jan. 20, 2009 (JP) .................................. 2009-009502

(51) Int. Cl.
*H01M 2/12* (2006.01)

(52) U.S. Cl.
USPC .................. 429/82; 429/53; 429/56; 429/57; 429/72; 429/129; 429/153; 429/163; 429/164; 429/167; 429/176; 429/177; 429/180; 429/241

(58) Field of Classification Search ............. 429/53, 429/56, 57, 72, 82, 89, 129, 133, 135, 138, 429/140, 142, 147, 153, 167, 176, 177, 180, 429/185, 241, 163–164, 246–247
See application file for complete search history.

(56) References Cited

U.S. PATENT DOCUMENTS

| | | | | |
|---|---|---|---|---|
| 3,943,007 | A | * | 3/1976 | Lebrun ........................ 429/87 |
| 2003/0049485 | A1 | * | 3/2003 | Brupbacher et al. ......... 428/615 |
| 2008/0050645 | A1 | * | 2/2008 | Kai et al. ...................... 429/61 |

FOREIGN PATENT DOCUMENTS

| | | |
|---|---|---|
| JP | 2006-185756 A | 7/2006 |
| JP | 2006-228610 A | 8/2006 |

\* cited by examiner

*Primary Examiner* — Patrick Ryan
*Assistant Examiner* — Ben Lewis
(74) *Attorney, Agent, or Firm* — Brinks Hofer Gilson & Lione

(57) ABSTRACT

A battery pack including at least a battery and a casing for accommodating the battery, in which the casing has a ventilation hole communicating with the outside of the casing, and a mesh member made of metal for covering at least the ventilation hole is provided at the side surface of the casing. Preferably, the mesh member is coated with an insulating resin.

19 Claims, 9 Drawing Sheets

BATTERY PACK, ELECTRONIC APPARATUS EQUIPPED WITH THE SAME AND ELECTRONIC APPARATUS EQUIPPED WITH BATTERY HOUSING PART

RELATED APPLICATIONS

This application claims priority under 35 U.S.C. §119 to Japanese Patent Application Nos. JP2008-023598 filed on Feb. 4, 2008 and JP2009-009502 filed on Jan. 20, 2009, the entire contents of which are hereby incorporated by reference.

FIELD OF THE INVENTION

The present invention relates to a battery pack having batteries accommodated in a casing or a housing case, an electronic apparatus equipped with the same, and an electronic apparatus equipped with a battery housing part for accommodating batteries.

BACKGROUND OF THE INVENTION

Recently, from the viewpoint of saving of resources and saving of energy, there is a mounting demand for reusable secondary batteries such as nickel-hydrogen, nickel-cadmium or lithium ion batteries. In particular, the lithium ion secondary battery is light in weight, high in electromotive force, and high in energy density. Owing to these features, the demand is expanding as driving power source for mobile telephone, digital camera, video camera, laptop computer, and various portable electronic appliances and mobile communication devices.

On the other hand, as the energy density tends to be higher in the downsizing trend, heat may be generated at high temperature depending on the manner of use. Accordingly, the safety is more and more important in the battery and the battery pack.

For example, when such battery is overcharged or overdischarged, or may be internally short-circuited or external short-circuited, gas may be generated inside. The generated gas causes to elevate the internal pressure of the battery. As a result, the outer jar may be ruptured by elevation of internal pressure. To prevent such rupture, these batteries are provided with exhaust hole or safety valves for releasing the gas.

In the battery pack having such batteries contained in a casing, a battery pack built in a structure capable of releasing the gas to outside of the casing has been propose for enhancing the safety.

Moreover, when such gas is generated, for example, due to effects of an overheated battery, smoke or fire may be induced in the battery pack in a worst case.

Hitherto, as disclosed in Japanese Unexamined Patent Publication No. 2006-228610 (patent document 1), the battery pack is proposed in a structure capable of preventing smoking or firing of the battery if the battery content ejects out. That is, in patent document 1, the battery pack includes a rechargeable battery, a filter unit, and an armor member. The filter unit is an outer part of the battery, and adsorbs the flammable matter contained in the content ejected from the battery. The armor member covers the battery and the filter unit, and is provided with a discharge hole for discharging the content purified by passing through the filter unit to outside.

The conventional battery pack of patent document 1 has such configuration, and if the content is ejected from any portion of the battery due to abnormality of protective circuit or the like, first the content is held within the armor member by the armor member covering the battery. Hence, the content will not leak out of the battery pack. The flammable matter contained in the content held within the armor member is securely adsorbed by the filter unit. Further, only the content not containing the flammable matter is discharged outside of the armor member through the discharge hole provided in the armor member. Thus, leak of the flammable matter to the surrounding of the battery pack is blocked, and smoking and firing can be prevented.

Or as disclosed in other prior art, in Japanese Unexamined Patent Publication No. 2006-185756 (patent document 2), the casing of the battery pack is made of a metal, and the battery pack enhanced in non-flammability of the casing is proposed.

However, in the case of patent document 1, a certain thickness is needed in the filter unit in order to adsorb sufficiently the content ejected from the battery, and the casing size is increased. Hence, such configuration of patent document 1 is contrary to the trend of compact design of battery pack.

In the case of patent document 2, a sufficient non-flammability is assured, but the casing is made of a metal. Hence, such configuration of patent document 2 is heavy in the weight of the battery pack, and when applied in a portable electronic appliance, it is contrary to the trend of weight reduction.

SUMMARY OF THE INVENTION

The battery pack of the present invention is a battery pack including at least a battery, and a casing for accommodating the battery, and the casing has a ventilation hole communicating with the outside of the casing, and a metal mesh member for covering at least the ventilation hole is provided at the side of the casing.

The electronic apparatus equipped with a battery pack of the present invention has a battery pack having such configuration.

By this configuration, if flame ejects out of the battery together with the content and gas, heat of the flame and heated content is immediately absorbed by the metal mesh member provided in the ventilation hole, and the gas or content as combustion source can be discharged outside of the battery pack while blocking ejection of flame to outside of the casing. Such mesh member is a flat plate, and increase of casing size can be suppressed, and since the mesh member is provided with a multiplicity of pores, and increase of weight can be also suppressed.

The electronic apparatus equipped with a battery housing part of the present invention has a battery housing part for accommodating the battery, and the battery housing part has a ventilation hole communicating with the outside of the electronic apparatus, and a metal mesh member for covering at least the ventilation hole is provided at the side of the battery housing part.

By this configuration, if flame ejects out of the battery together with the content and gas, heat of the flame and heated content is immediately absorbed by the metal mesh member provided in the ventilation hole, and the gas or content as combustion source can be discharged outside of the battery housing part or the electronic apparatus while blocking ejection of flame to outside of the casing. Such mesh member is a flat plate, and increase of casing size can be suppressed, and since the mesh member is provided with a multiplicity of pores, increase of weight can be also suppressed.

DETAILED DESCRIPTION OF THE PREFERRED EMBODIMENTS

Figure 1:
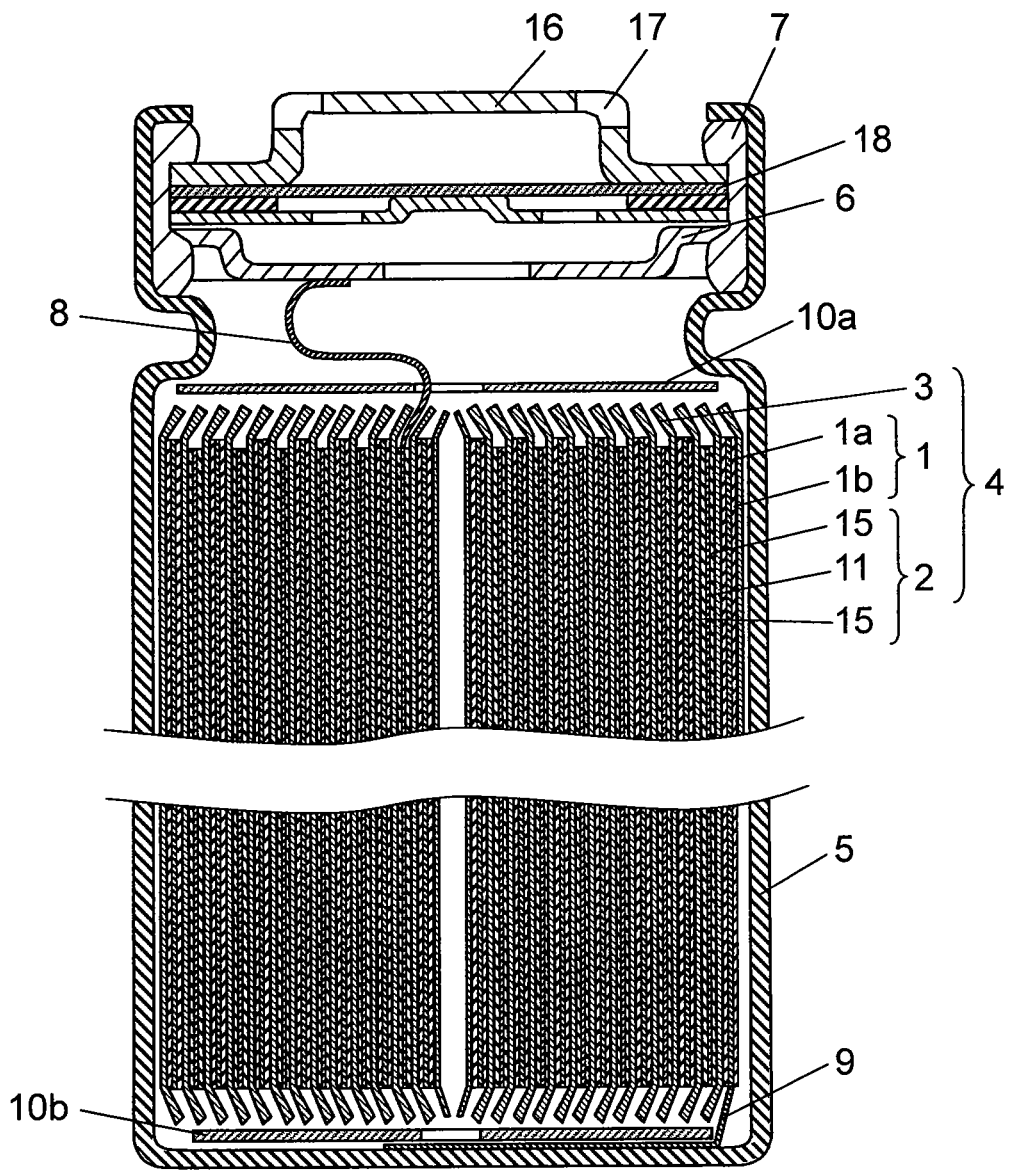
FIG. 1 is a cross sectional view of a battery accommodated in a battery pack in preferred embodiment 1 of the present invention.

Preferred embodiments of the present invention are described below while referring to the accompanying drawings, in which same elements are identified with same reference numerals. The present invention is not limited to the following description as far as it is based on the basic features described in this specification. In the following description, the battery refers to the lithium ion and other non-aqueous electrolyte secondary battery (commonly called the battery), but is not limited to the illustrated examples alone.

Preferred Embodiment 1

FIG. 1 is a cross sectional view of a battery accommodated in a battery pack in preferred embodiment 1 of the present invention.

As shown in FIG. 1, cylindrical battery 19 includes electrode group 4 having positive electrode 1 and negative electrode 2 opposite to positive electrode 1 wound around by way of separator 3. Positive electrode 1 has positive electrode lead 8 made of, for example, aluminum. Negative electrode 2 has negative electrode lead 9 made of, for example, nickel provided at one end. Electrode group 4 is inserted into battery case 5 together with upper and lower insulation plates 10a, 10b. The other end of positive electrode lead 8 is welded to sealing plate 6, and the other end of negative electrode lead 9 is welded to the bottom of battery case 5. Battery case 5 is filled with a non-aqueous electrolyte (not shown) for conducting lithium ions. In the sealing part at the open end of battery case 5, positive electrode cap 16, current shielding member 18 such as PTC element, and sealing plate 6 are crimped through gasket 7. Positive electrode cap 16 is provided with exhaust hole 17 for releasing the generated gas in the event of trouble of electrode group 4 or the like. Positive electrode 1 is composed of positive electrode current collector 1a and positive electrode layer 1b containing positive electrode active material.

Herein, positive electrode layer 1b contains lithium complex oxide such as $LiCoO_2$, $LiNiO_2$, $Li_2MnO_4$, or their mixture or complex compound as positive electrode active material. Positive electrode layer 1b further contains conductive agent and binding agent. The conductive agent includes, for example, graphites such as natural graphite and artificial graphite, acetylene black, ketjen black, channel black, furnace black, lamp black, thermal black, and other carbon blacks. The binding agent includes, for example, PVDF, polytetrafluoroethylene, polyethylene, polypropylene, aramid resin, polyamide, and polyimide.

Positive electrode current collector 1a used in positive electrode 1 may be aluminum (Al), carbon, conductive resin, and others.

The non-aqueous electrolyte is electrolyte solution having solute dissolved in an organic solvent, or polymer electrolyte layer containing them and non-fluidized by high polymer. The elute of non-aqueous electrolyte includes $LiPF_6$, $LiBF_4$, $LiClO_4$, $LiAlCl_4$, $LiSbF_6$, $LiSCN$, $LiCF_3SO_3$, $LiN(CF_3CO_2)$, $LiN(CF_3SO_2)$, etc. The organic solvent includes, for example, ethylene carbonate (EC), propylene carbonate, butylene carbonate, vinylene carbonate, dimethyl carbonate (DMC), diethyl carbonate, and ethyl methyl carbonate (EMC).

Negative electrode current collector 11 of negative electrode 2 is stainless steel, nickel, copper, titanium or other metal foil, carbon or conductive resin thin film.

Negative electrode layer 15 of negative electrode 2 may be any negative electrode active material such as graphite, carbon material, silicon (Si), or tin (Sn), of which theoretical capacity density reversibly intercalating and de-intercalating lithium ions exceeds 833 mAh/cm$^3$ of graphite.

Figure 2A:
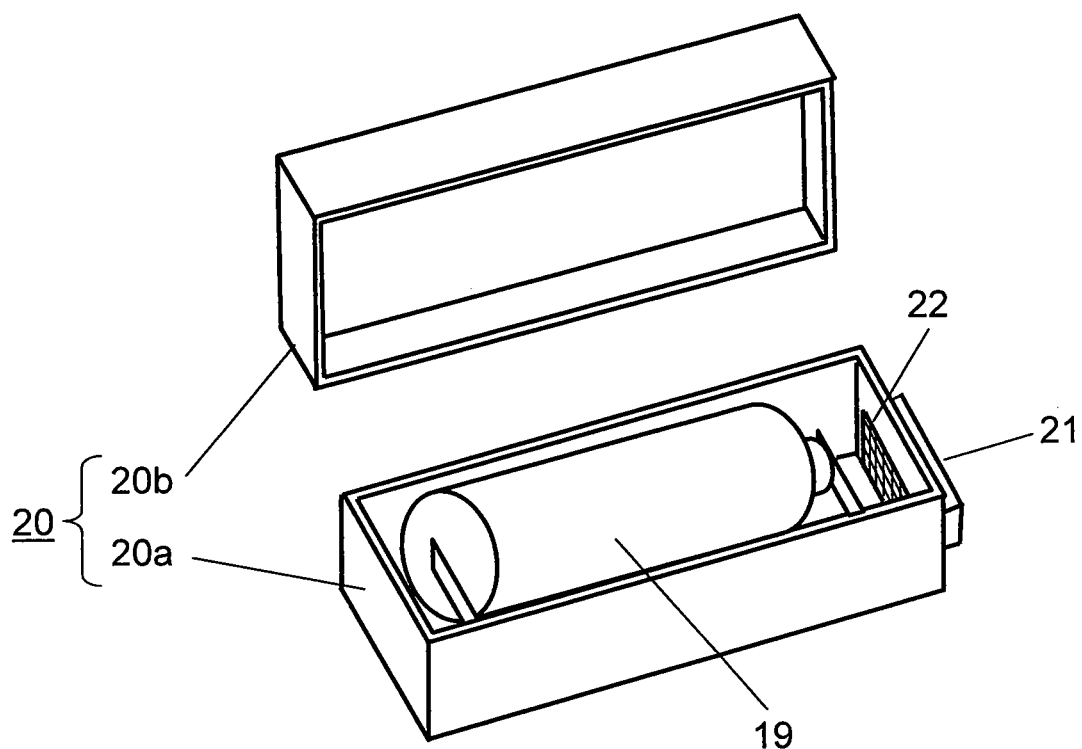
FIG. 2A is a perspective view showing the configuration of the battery pack.
Figure 2B:
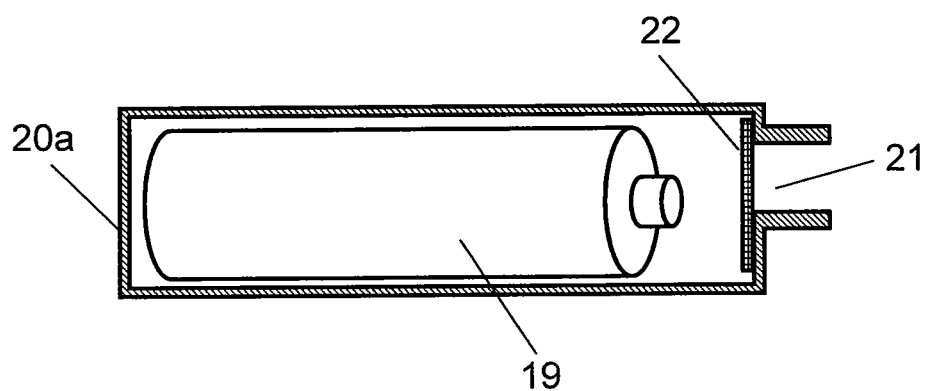
FIG. 2B is an essential sectional view of the battery pack as seen from a longitudinal direction.

The battery pack in preferred embodiment 1 of the present invention is specifically described below while referring to FIG. 2A and FIG. 2B. FIG. 2A is a perspective view showing the configuration of the battery pack of the preferred embodiment, and FIG. 2B is an essential sectional view of the battery pack as seen from a longitudinal direction.

The battery pack mainly includes battery 19, and casing 20 for accommodating battery 19. Casing 20 shown in FIG. 2A and FIG. 2B is composed of lower case part 20a and upper case part 20b as its lid. Lower case part 20a and upper case part 20b are made of, for example, plastic formed in a box shape. By putting upper case part 20b on lower case part 20a disposing battery 19, this battery pack is formed. The battery pack is installed, for example, in an electronic apparatus and utilized as its power source.

In the battery pack, lower case part 20a of casing 20 has ventilation hole 21 communicating between the inside and outside of the casing. Such ventilation hole 21 is provided for exhausting the gas to outside of casing 20 if gas is ejected from exhaust hole 17 of battery 19. That is, when the gas is ejected from exhaust hole 17 of battery 19, the gas is exhausted to outside of casing 20 through this ventilation hole 21. When the battery pack is provided with such ventilation hole 21, it prevents troubles of rupture of the battery pack itself due to filling of the battery pack with gas.

In the preferred embodiment, ventilation hole 21 is disposed at a position confronting the sealing part of battery 19 having exhaust hole 17. By such configuration, the gas ejected from exhaust hole 17 of battery 19 can be efficiently exhausted to outside of the casing through ventilation hole 21 near exhaust hole 17.

The battery pack is also characterized by metal mesh member 22 provided so as to cove at least ventilation hole 21, at the inner side of lower case part 20a.

Figure 3A:
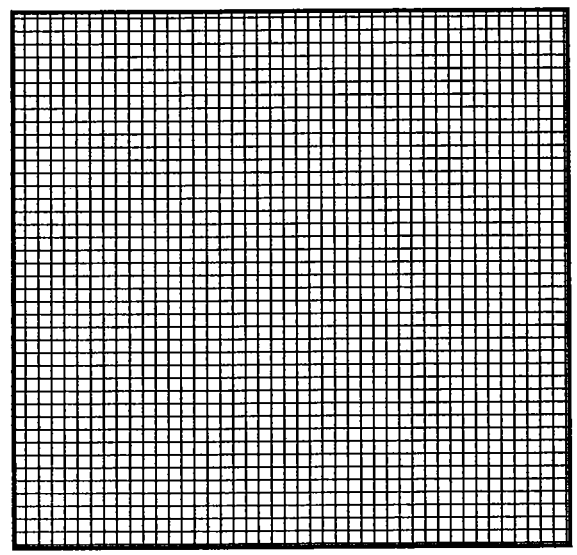
FIG. 3A is a diagram showing an example of shape of mesh member of the battery pack.
Figure 3B:
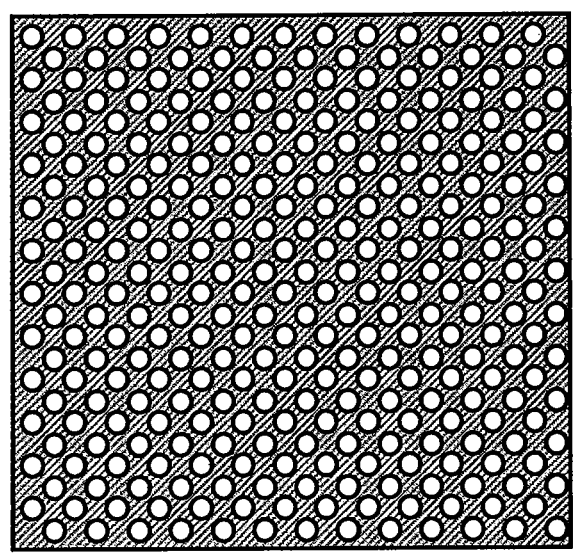
FIG. 3B is a diagram showing other example of shape of mesh member of the battery pack.

FIG. 3A and FIG. 3B are diagrams showing examples of the shape of such mesh member 22. FIG. 3A shows an example of mesh member 22 of reticular pattern. Mesh member 22 as shown in FIG. 3A is formed by providing a metal plate with a multiplicity of square holes. FIG. 3B shows an example of mesh member 22 in hole shape. Mesh member 22 as shown in FIG. 3B is formed by providing a metal plate with a multiplicity of circular holes. Such mesh member 22 may be formed by drilling holes in the metal plate by punching or etching. Further, mesh member 22 may be formed like metal net as shown in FIG. 3A by weaving a multiplicity of metal wires. Mesh member 22 of the preferred embodiment may be formed in other shape than shown in FIG. 3A or FIG. 3B, and the structure is not particularly limited as far as holes are provided in a flat metal plate.

It has been formerly known that a metal formed like mesh such as mesh net has an effect of suppressing ejection of flame. For example, the reticular glass traditionally used as fire fighting means is known to have an effect of enhancing the strength by the metal net in the glass, and a flame shielding effect of preventing the flame from spreading from the window in the event of a fire. That is, in the metal net or the like, the pore space occupies the majority of the space, but the metal is extremely high in heat conductivity. Accordingly, if the occupying rate of metal part is small as compared with the pore space, the metal part quickly absorbs the heat of the flame, and suppresses ejection of flame.

That is, mesh member 22 in the battery pack is provided in order to suppress ejection of flame to outside of casing 20 if flame ejects from battery 19. In particular, mesh member 22 is excellent in ventilation, and if gas not accompanied by flame is generated from battery 19 is generated, the gas can be exhausted from ventilation hole 21 same as in the prior art. In a worst case, if flame ejects from battery 19, the flame can be shielded, and spreading of flame to the battery pack part can be prevented. In such a case, since the gas or content as combustion source can be discharged through ventilation hole 21 while shielding the flame, the fire can be extinguished immediately.

While maintaining the gas exhaust effect through ventilation hole 21, in order to exhibit the flame and heat absorption effect by mesh member 22, that is, to exhibit the flame shielding effect, preferably, the mesh opening of the pores of mesh member 22 should be 3 mm or less, and the thickness of mesh member 22 should be 50 μm or more. By keeping the porosity of mesh member 22 at 40% or more to 70% or less, the flame and heat absorption effect by mesh member 22 and gas exhaust effect by a multiplicity of pores can be exhibited in good balance.

Thus, in the battery pack of the preferred embodiment, mesh member 22 having flame shielding effect is disposed so as to cover ventilation hole 21. Accordingly, in the battery pack, if flame ejects from battery 19, ejection of flame from the battery pack is prevented, and the safety can be enhanced. Since mesh member 22 is a flat metal plate having a multiplicity of pores, increase of size or weight of the battery pack can be suppressed.

In the preferred embodiment, an example of battery pack containing only one battery 19 is shown, but it is not limited. Other modified examples of the preferred embodiment are explained below.

Figure 4:
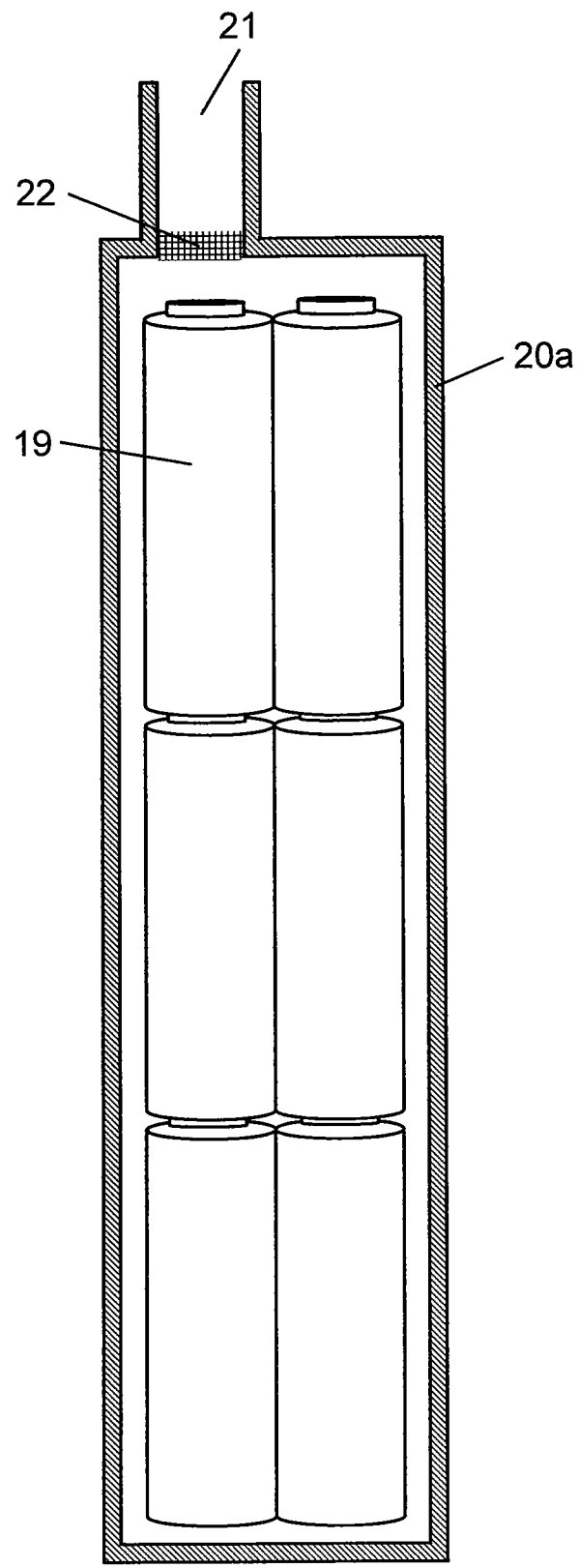
FIG. 4 is an essential sectional view of other example of the battery pack as seen from a longitudinal direction.

FIG. 4 is an essential sectional view of other example of the battery pack of the preferred embodiment as seen from a longitudinal direction. Herein, a plurality of batteries 19 are contained, and six batteries 19 are shown in FIG. 4. Although not shown in the drawing, for example, the battery pack may contain a circuit board having circuit parts for charging and discharging.

Figure 5:
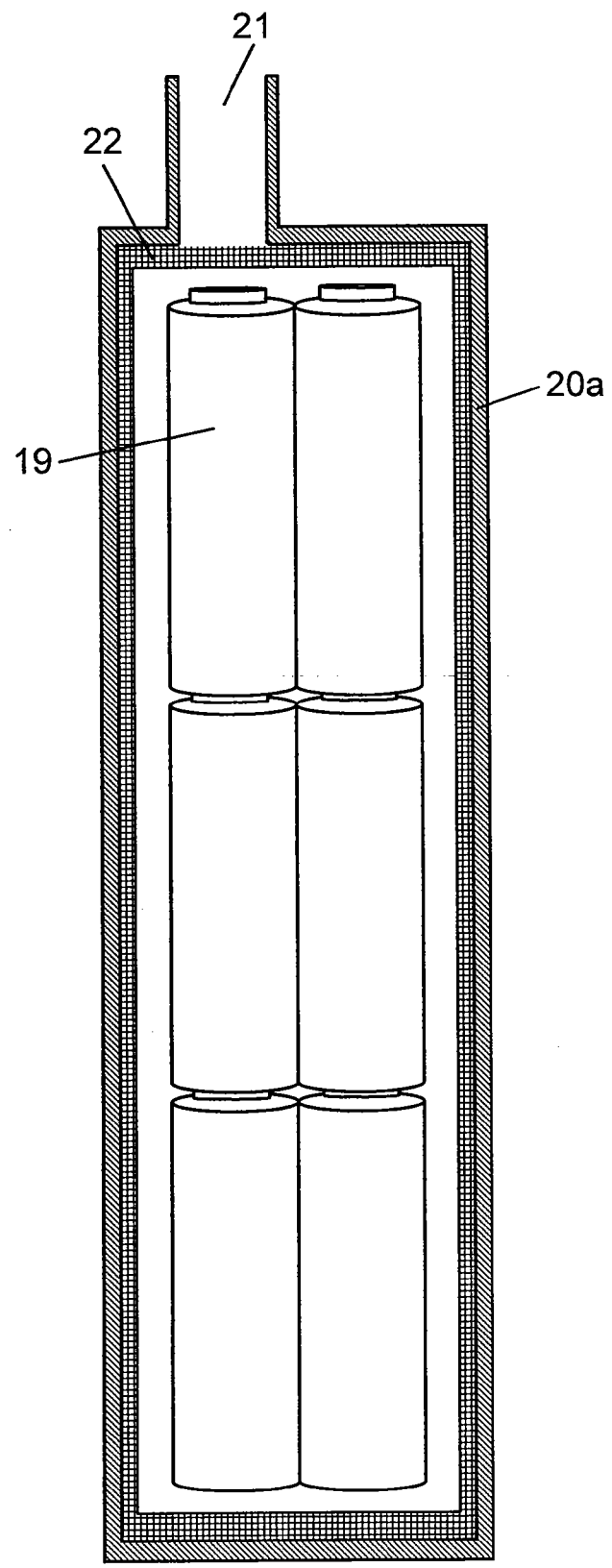
FIG. 5 is an essential sectional view of another example of the battery pack as seen from a longitudinal direction.

FIG. 5 is an essential sectional view of another example of the battery pack of the preferred embodiment as seen from a longitudinal direction. In the battery pack shown in FIG. 5, mesh member 22 is disposed on the entire side surface in casing 20. By such configuration, the area of mesh member 22 is wider, and the heat absorbing effect by the metal part can be enhanced. If flame or high-temperature gas ejects from any battery 19, the heat can be absorbed immediately by the metal part of nearby mesh member 22, and effects of heat or flame to outside of the casing can be suppressed.

As explained herein, the battery pack of preferred embodiment 1 is battery pack including at least battery 19 and casing 20 for accommodating battery 19, and casing 20 has ventilation hole 21 communicating with the outside of the casing, and mesh member 22 made of metal for covering at least ventilation hole 21 is provided at the side of casing 20.

By such configuration, the battery pack of preferred embodiment 1 can prevent the flame from ejecting outside of casing 20 by means of mesh member 22, for example, if flame ejects from exhaust hole 17 due to abnormality in battery 19. While shielding the flame, the gas or content as combustion source can be discharged through ventilation hole 21. Since mesh member 22 is a flat metal plate having a multiplicity of pores, increase of size or weight of battery pack can be suppressed. Therefore, according to the battery pack of preferred embodiment 1, the present invention presents a battery pack enhanced in safety and capable of preventing ejection of flame from the battery pack in the event of ejection of flame from the battery, while suppressing increase of size or weight of battery pack.

Preferred Embodiment 2

Figure 6:
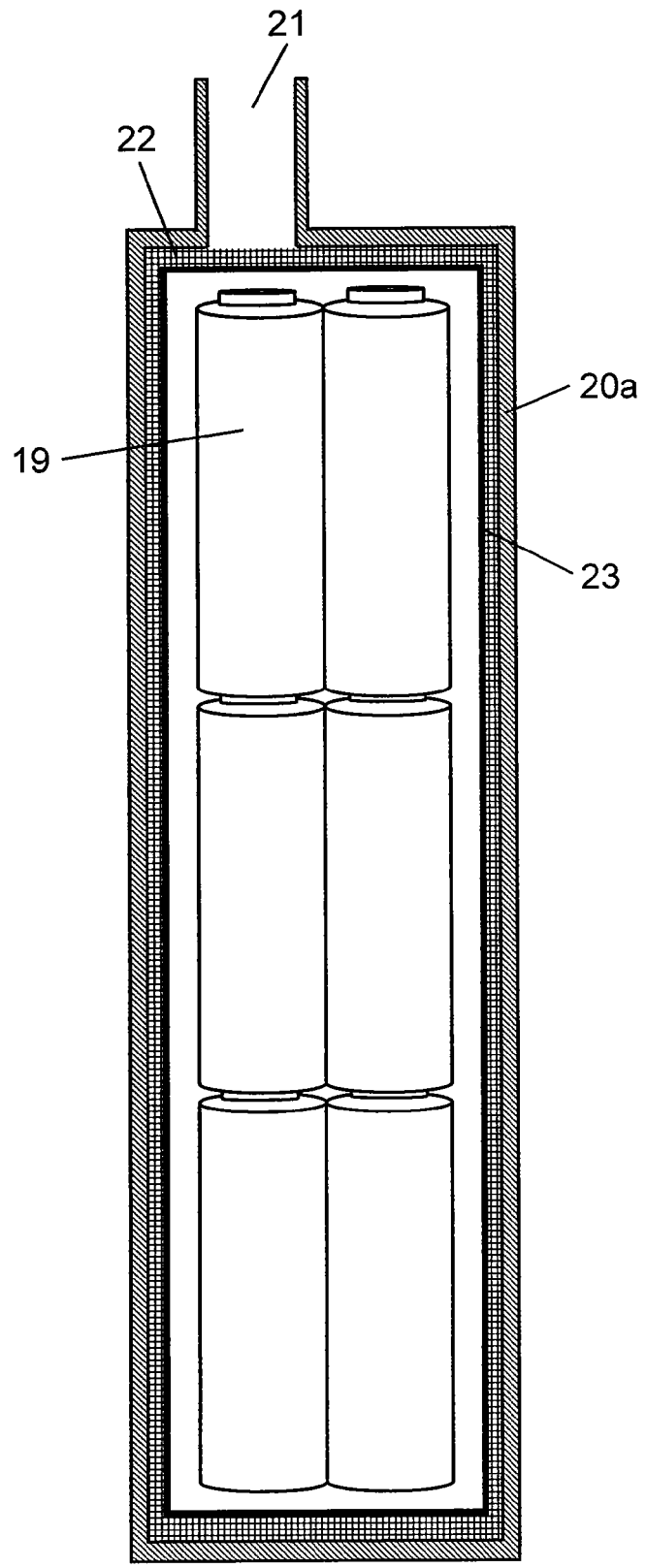
FIG. 6 is an essential sectional view of a battery pack in preferred embodiment 2 of the present invention as seen from a longitudinal direction.

FIG. 6 is an essential sectional view of a battery pack in preferred embodiment 2 of the present invention as seen from a longitudinal direction. In this preferred embodiment, an example of battery pack accommodating a plurality of batteries 19 as shown in FIG. 4 or FIG. 5 is explained. The battery pack shown in FIG. 6 is similar to the battery pack shown in FIG. 5, except that mesh member 22 is coated with insulating resin 23.

That is, since mesh member 22 is made of metal, if the both electrodes of battery 19 contact with mesh member 22 due to any cause, short-circuiting occurs. To avoid such problem, in the battery pack of the preferred embodiment, mesh member 22 coated with insulating resin 23 is disposed so that insulating resin 23 may come to the side of battery 19. Insulating resin 23 is made of a resin to be dissolved by flame.

Thus, in the preferred embodiment, insulating resin 23 is provided to prevent contact between mesh member 22 made of metal and the electrode part of the battery, and overheating and other trouble of battery due to short-circuit in ordinary state is prevented. The location of mesh member 22 may be disposed only at one position of ventilation hole 21 as shown in FIG. 4. The shape of mesh member 22 may be same as in preferred embodiment 1, that is, a flat metal plate may be provided with pores.

For example, if an abnormality occurs in battery 19, and flame ejects from exhaust hole 17, first, insulating resin 23 is melted by the flame, and mesh member 22 is exposed. Later, same as in preferred embodiment 1, mesh member 22 prevents the flame from ejecting out of the casing, and the gas or content as combustion source can be discharged through ventilation hole 21.

Thus, the battery pack of the preferred embodiment prevents short-circuiting due to mesh member 22 in ordinary state. At the same time, in the event of abnormality such as ejection of flame from battery 19, while the flame is shielded, the gas or content as combustion source can be discharged through ventilation hole 21.

Figure 7:
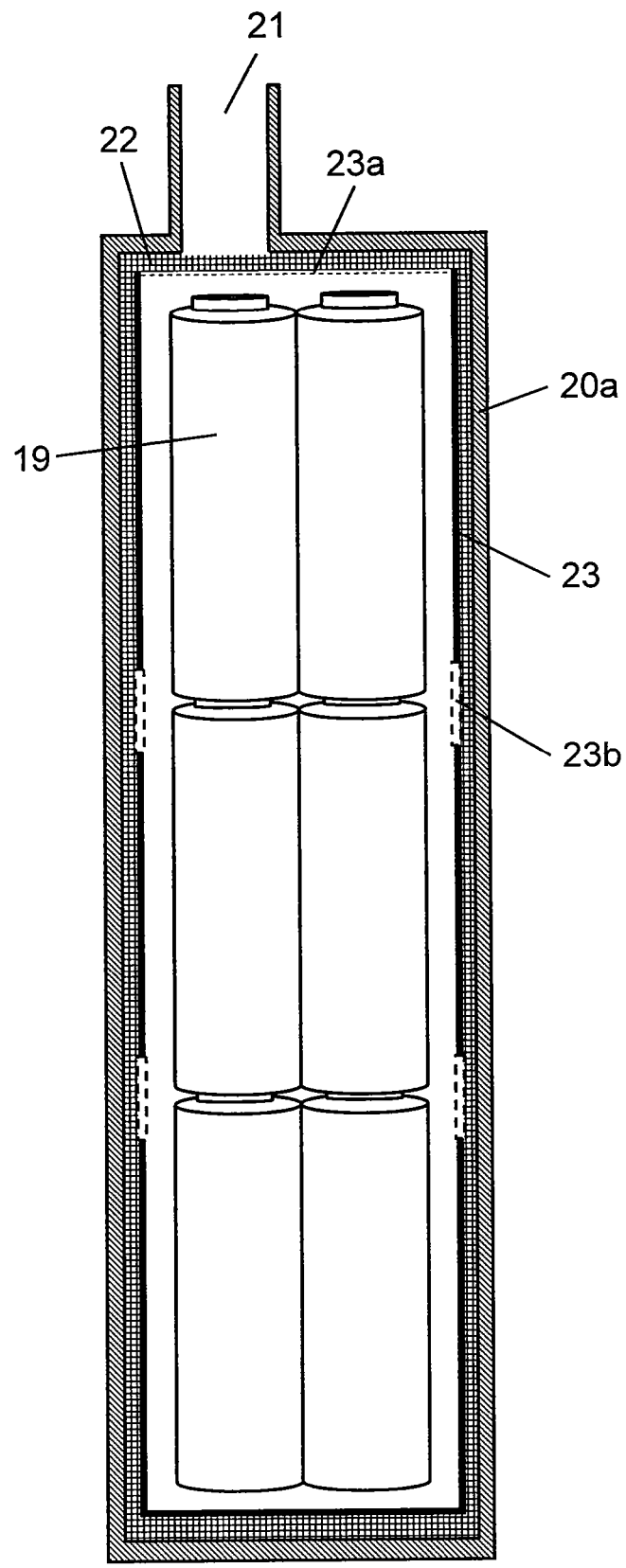
FIG. 7 is an essential sectional view of a different example of the battery pack as seen from a longitudinal direction.

FIG. 7 is an essential sectional view of a different example of the battery pack of the preferred embodiment as seen from a longitudinal direction. The battery pack shown in FIG. 7 is characterized by coating mesh member 22 with insulating resin 23 so that windows 23a, 23b may be disposed near the sealing part of battery 19. In FIG. 7, coating-free window 23a is provided at the position of mesh member 22 opposite to the sealing part of battery 19 at the leading end of the sealing part side. Other windows 23b are provided near the sealing part of other batteries 19 that leading end battery 19. By such configuration, the battery pack of the preferred embodiment prevents short-circuiting due to mesh member 22. While preventing short-circuiting, near the sealing part high in possibility of ejection of flame from battery 19, since the area is not coated with insulating resin 23, a quick flame shielding effect can be exhibited by mesh member 22.

As explained herein, the battery pack in preferred embodiment 2 is a battery pack including at least battery 19 and casing 20 for accommodating battery 19, and casing 20 has ventilation hole 21 communicating with the outside of the casing, and mesh member 22 made of metal covering at least ventilation hole 21 is provided at the side of casing 20. Mesh member 22 is coated with insulating resin 23.

By such configuration, the battery pack of preferred embodiment 2 can prevent short-circuiting due to mesh member 22 in ordinary state. At the same time, in this battery pack, in an abnormal state of ejection of flame from battery 19, while shielding the flame, the gas or content as combustion source can be discharged through ventilation hole 21. Therefore, according to the battery pack of preferred embodiment 2, the present invention presents a battery pack enhanced in safety and capable of preventing ejection of flame from the battery pack in the event of ejection of flame from the battery, while suppressing increase of size or weight of battery pack.

Preferred Embodiment 3

Figure 8:
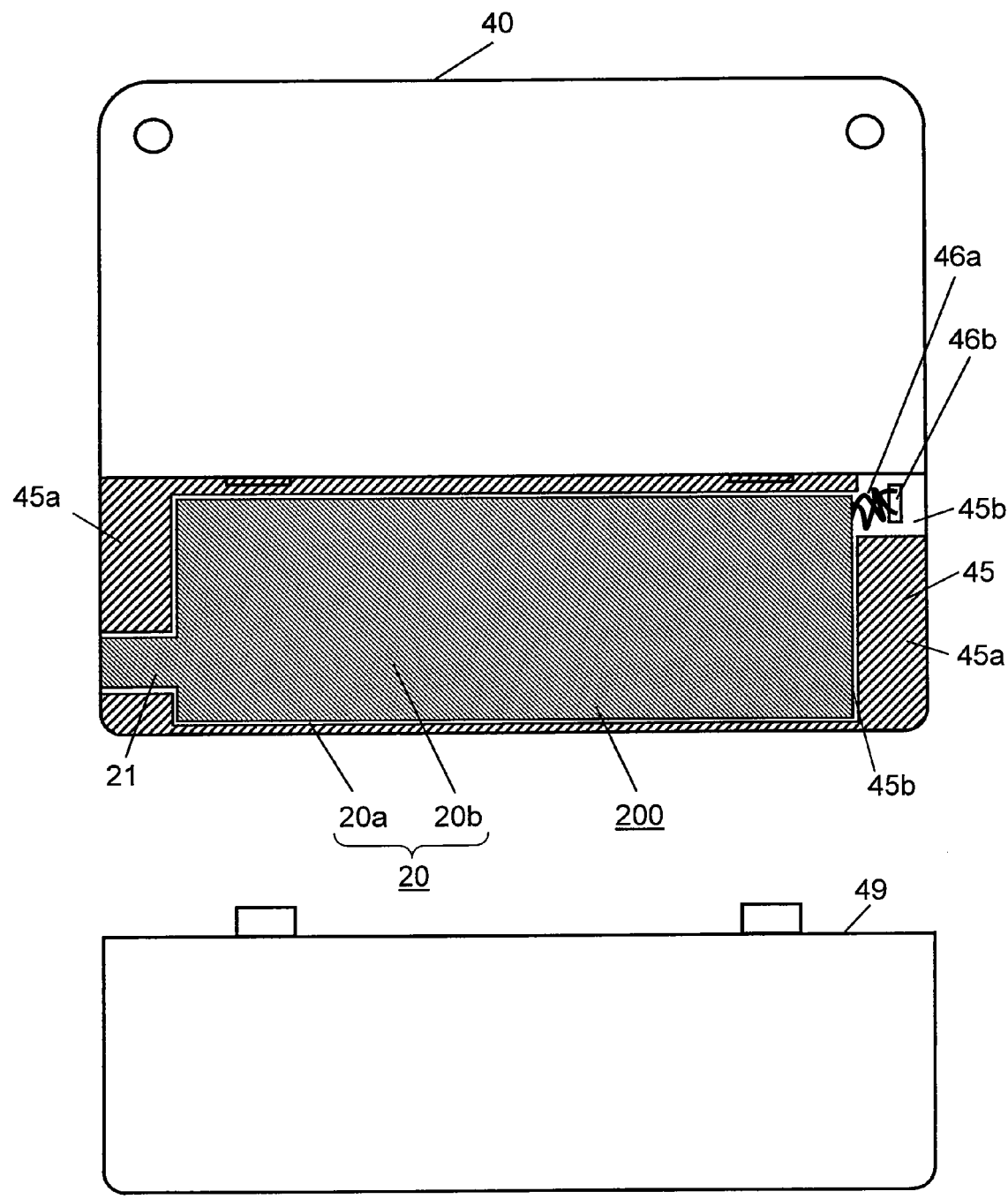
FIG. 8 is a schematic diagram of an electronic apparatus in preferred embodiment 3 of the present invention as seen from a reverse side direction.

FIG. 8 is a schematic diagram of an electronic apparatus in preferred embodiment 3 of the present invention as seen from a reverse side direction. The electronic apparatus of the preferred embodiment has the battery pack as set forth in preferred embodiment 1 and preferred embodiment 2. This preferred embodiment refers, for example, to electronic apparatus 40 having a battery pack such as portable personal computer.

As shown in FIG. 8, electronic apparatus 40 has battery pack 200. Electronic apparatus 40 has a detachable back lid 49 disposed at the backside. By removing back lid 49, battery pack 200 can be taken out. Battery pack 200 can be exchanged easily.

The inside of electronic apparatus 40 has battery pack housing part 45 composed of housing convex part 45a and housing concave part 45b for accommodating battery pack 200. Housing concave part 45b is surrounded by housing convex part 45a, so that battery pack 200 may be mounted or dismounted. By assembling battery pack 200 in such housing concave part 45b, battery pack 200 is installed in electronic apparatus 40. From battery pack 200, connection wire 46a having connector 46b disposed at the lading end is extended. By connecting this connector 46b to the main body side connector of electronic apparatus 40, the electric power from battery pack 200 is supplied to the electronic circuits in electronic apparatus 40.

Herein, battery pack 200 may be same as the battery pack described in preferred embodiment 1 or preferred embodiment 2. FIG. 8 shows an example of application of battery pack in preferred embodiment 1 shown in FIG. 4. That is, the inside of casing 20 of battery pack 200 has a configuration as shown in FIG. 4. Battery pack 200 accommodates a plurality of batteries 19 as shown in FIG. 4, and has ventilation hole 21 for communicating between the inside and outside of casing 20. Further, battery pack 200 has ventilation hole 21 disposed at a position opposite to the sealing part of battery 19 having exhaust hole 17, and has mesh member 22 made of metal so as to cover at least ventilation hole 21 provided at the inner side face of lower case part 20a. Ventilation hole 21 of battery pack 200 is further extended to the casing side surface of electronic apparatus 40, and the inside of battery pack 200 communicates with the outside of electronic apparatus 40 by way of ventilation hole 21. In this preferred embodiment, the battery pack is shown in an example of the battery pack shown in FIG. 4, but the present invention may be applied in other battery pack as disclosed in preferred embodiment 1 or preferred embodiment 2.

As explained herein, electronic apparatus 40 of the preferred embodiment is an electronic apparatus having the battery pack as disclosed in preferred embodiment 1 or preferred embodiment 2. By this configuration, in the event of ejection of flame from battery 19, the heat of flame and other high-temperature content can be immediately absorbed by mesh member 22 made of metal provided in ventilation hole 21, and the temperature is lowered, and the gas can be exhausted outside through pores in mesh member 22 while preventing ejection of flame to outside of the casing. Since such mesh member 33 is a thin plate, increase of casing size is suppressed, and since mesh member 22 has a multiplicity of pores, increase of weight can be also suppressed.

Preferred Embodiment 4

Figure 9:
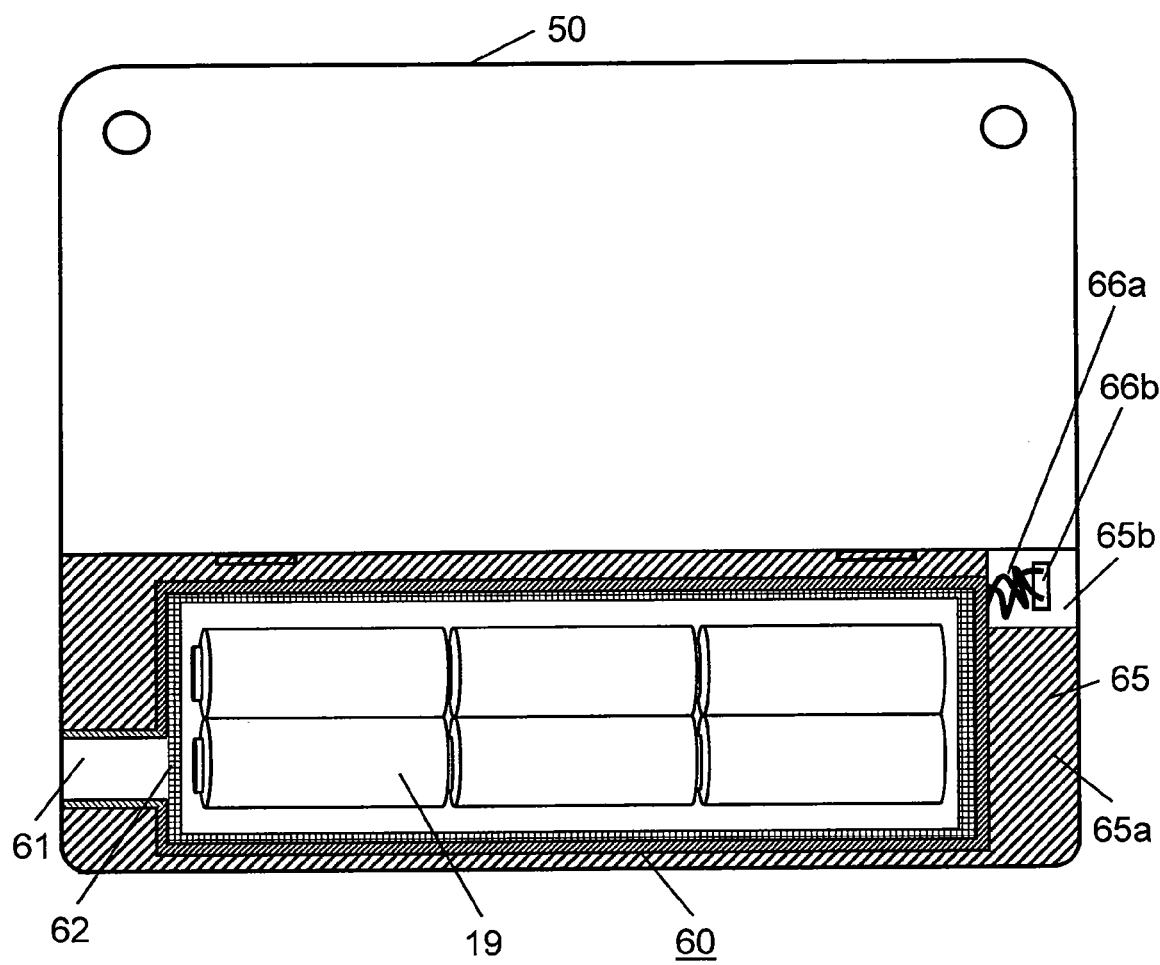
FIG. 9 is a schematic diagram of an electronic apparatus in preferred embodiment 4 of the present invention as seen from a reverse side direction.
Figure 9:
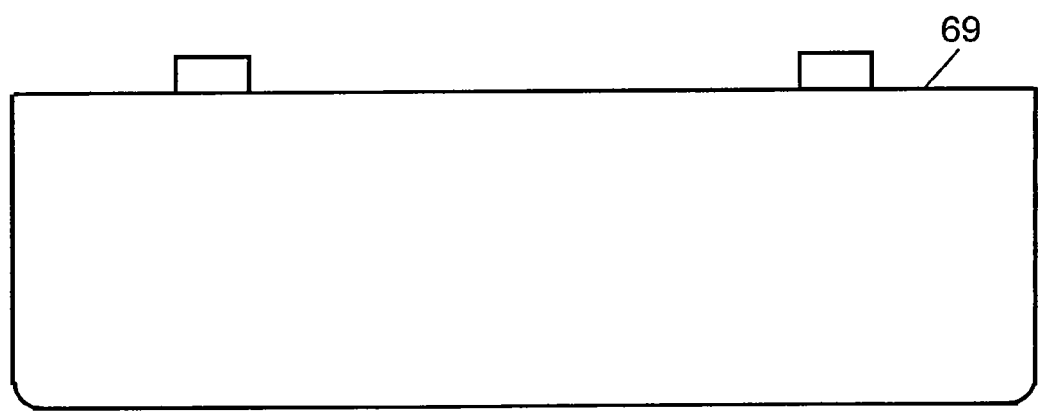

FIG. 9 is a schematic diagram of an electronic apparatus in preferred embodiment 4 of the present invention as seen from a reverse side direction. The electronic apparatus of the preferred embodiment has a battery housing part for accommodating batteries. This preferred embodiment refers, for example, to electronic apparatus 50 having a battery housing part such as portable personal computer.

Electronic apparatus 50 includes, as shown in FIG. 9, aside from electronic circuits, batteries 19 for supplying electric power to the electronic circuits, and battery housing part 60 for accommodating batteries 19. Electronic apparatus 50 has a detachable back lid 69 disposed at the backside. By removing back lid 69, batteries 19 can be taken out, and batteries 19 can be exchanged easily. Battery housing part 60 is provided in electronic apparatus 50, and is, for example, a plastic casing having a part formed like a box. By fitting an upper lid (not shown) to battery housing part 60, battery housing part 60 accommodating batteries 19 is closed tightly. From battery housing part 60, connection wire 66a having connector 66b provided at the leading end is extending. By connecting connector 66b to the main body side connector of electronic apparatus 50, electric power from battery 19 is supplied into electronic circuits in electronic apparatus 50.

Electronic apparatus 50 includes ventilation hole 61 for communicating between the inside of battery housing part 60 and the outside of electronic apparatus 50. Such ventilation hole 61 is provided for exhausting the gas to outside of electronic apparatus 50 if gas is ejected from exhaust hole 17 of battery 19. That is, when gas is ejected from exhaust hole 17 of battery 19, the gas is exhausted to outside of electronic apparatus 50 through ventilation hole 61. Battery housing part 60 is provided with such ventilation hole 61, and it is intended to prevent trouble such as rupture of battery housing part 60 due to filing of battery housing part 60 with gas.

At a position opposite to the sealing part of battery 19 having exhaust hole 17, ventilation hole 61 is disposed. By such configuration, the gas ejecting from exhaust hole 17 of battery 19 can be efficiently exhausted to outside of the casing through ventilation hole 61 near exhaust hole 17.

Further, electronic apparatus 50 is provided with mesh member 62 made of metal so as to cover at least ventilation hole 61, at the inner side face of battery housing part 60. In FIG. 9, mesh member 62 is provided at the entire side surface in battery housing part 60. By such configuration, the area of mesh member 62 is wider, and the heat absorbing effect by the metal part can be enhanced. The shape of mesh member 62 may be same as the shape of mesh member 22 in preferred embodiment 1 as shown, for example, in FIG. 3A or FIG. 3B. The mesh member may be also coated with an insulating resin as shown in preferred embodiment 2. Or, as shown in FIG. 7, the mesh member may have windows provided near the sealing part of battery 19.

Such mesh member 62, same as in preferred embodiment 1 or preferred embodiment 2, prevents flame, if ejecting from battery 19, from ejecting outside of electronic apparatus 50 through ventilation hole 61. As mentioned above, since mesh member 62 is excellent in ventilation performance, and if gas not accompanied by flame is generated from battery 19, the gas can be exhausted from ventilation hole 61. Or if flame ejects from battery 19, the flame can be shielded, and spreading of flame to outside of battery housing part 60 can be prevented. In such a case, the gas or content as combustion source can be discharged through ventilation hole 61 while shielding the flame.

As explained in preferred embodiment 1, while maintaining the gas exhaust effect through ventilation hole 61, in order to exhibit the flame shielding effect by mesh member 62, preferably, the mesh opening of the pores of mesh member 62 should be 3 mm or less, and the thickness of mesh member 22 should be 50 μm or more. By keeping the porosity of mesh member 22 at 40% or more to 70% or less, the flame and heat absorption effect by mesh member 62 and gas exhaust effect by a multiplicity of pores can be exhibited in good balance.

As explained herein, electronic apparatus 50 of the preferred embodiment is an electronic apparatus having battery housing part 60 for accommodating battery 19, and battery housing part 60 has ventilation hole 61 communicating with the outside of electronic apparatus 50, and mesh member 62 made of metal for covering at least ventilation hole 61 is provided at the side face of battery housing part 60. By such configuration, if flame ejects from battery 19 together with the content and gas, heat of the flame and heated content is immediately absorbed by metal mesh member 62 provided in ventilation hole 61, and the gas or content as combustion source can be discharged outside of battery housing part 60 or electronic apparatus 50 while blocking ejection of flame to outside of the casing. Such mesh member 62 is a flat plate, and increase of casing size can be suppressed, and since mesh member 62 is provided with a multiplicity of pores, increase of weight can be also suppressed.

According to the battery pack of the present invention, the electronic apparatus equipped with the same, and the electronic apparatus equipped a battery housing part, while suppressing increase of size and weight of battery pack and electronic apparatus equipped with battery pack or battery housing part, if flame ejects from the battery, ejection of flame from battery pack, battery housing part of electronic apparatus can be prevented, and the battery pack and the electronic apparatus equipped with battery pack or battery housing part enhanced in safety can be presented.

Accordingly, the present invention is very useful as the battery pack accommodating batteries, the electronic apparatus equipped with battery pack, and the electronic apparatus equipped with battery housing part demanded to be smaller in size, lighter in weight, and higher in safety.

What is claimed is:

1. A battery pack comprising:
   a battery provided with an exhaust vent;
   a casing accommodating the battery, the casing being provided with a ventilation hole communicating with an outside of the casing; and
   a metal mesh member covering the ventilation hole, the metal mesh member being provided at a side of the casing, wherein
   the mesh member is coated with an insulating resin coating, and wherein the mesh member has a coating-free window near the exhaust vent of the battery, and
   a surface of the mesh member is exposed within the window.

2. The battery pack of claim 1, wherein the mesh member is provided at an inner side surface of the casing.

3. The battery pack of claim 2, wherein the mesh member overlays an entire inner side surface in the casing.

4. The battery pack of claim 1, wherein the ventilation hole covered with the mesh member is disposed at a position facing the exhaust vent of the battery.

5. The battery pack of claim 1, wherein the mesh member comprises one of a net configuration and a sheet having holes therein.

6. The battery pack of claim 5, wherein the mesh member includes openings having a size of 3 mm or less.

7. The battery pack of claim 5, wherein the mesh member has a thickness of 50 μm or more.

8. The battery pack of claim 5, wherein the mesh member has a porosity of 40% to 70%, inclusive.

9. An electronic apparatus equipped with a battery pack according to claim 1.

10. An electronic apparatus equipped with a battery housing part for accommodating a battery provided with an exhaust vent,
    wherein the battery housing part is provided with a ventilation hole communicating with an outside of the electronic apparatus, a metal mesh member covering the ventilation hole is provided at a side of the battery housing part, the mesh member is coated with an insulating resin coating and the mesh member has a coating-free window near the exhaust vent of the battery, and
    a surface of the mesh member is exposed within the window.

11. The electronic apparatus with a battery housing part of claim 10, wherein the mesh member is provided at an inner side surface of the battery housing part.

12. The electronic apparatus with a battery housing part of claim 11, wherein the mesh member overlays an entire inner side surface in the battery housing part.

13. The electronic apparatus with a battery housing part of claim 10, wherein the ventilation hole covered with the mesh member is disposed at a position facing the exhaust vent of the battery.

14. The electronic apparatus with a battery housing part of claim 10, wherein the mesh member comprises one of a net configuration and a sheet having holes therein.

15. The electronic apparatus with a battery housing part of claim 14, wherein the mesh member includes openings having a size of 3 mm or less.

16. The electronic apparatus with a battery housing part of claim 14, wherein the mesh member has a thickness of 50 μm or more.

17. The electronic apparatus with a battery housing part of claim 14, wherein the mesh member has a porosity of 40% to 70%, inclusive.

18. A battery pack comprising:
- a battery provided with an exhaust vent;
- a casing accommodating the battery, the casing being provided with a ventilation hole communicating with an outside of the casing; and
- a metal mesh member covering the ventilation hole, the metal mesh member being provided at a side of the casing and having an insulating resin coating,
- wherein the ventilation hole covered with the mesh member has a coating-free window disposed at a position facing the exhaust vent of the battery.

19. An electronic apparatus equipped with a battery housing part for accommodating a battery provided with an exhaust vent,
- wherein the battery housing part is provided with a ventilation hole communicating with an outside of the electronic apparatus,
- a metal mesh member covering the ventilation hole and having an insulating resin coating is provided at a side of the battery housing part, and
- the ventilation hole covered with the mesh member has a coating-free window disposed at a position facing the exhaust vent of the battery.

* * * * *